United States Patent
Rye (10) Patent No.: US 9,072,285 B1
(45) Date of Patent: Jul. 7, 2015

(54) LURE WITH CYCLICALLY REVERSING BLADE ROTATION

(71) Applicant: Ryan Patrick Rye, Lawrenceville, GA (US)

(72) Inventor: Ryan Patrick Rye, Lawrenceville, GA (US)

( * ) Notice: Subject to any disclaimer, the term of this patent is extended or adjusted under 35 U.S.C. 154(b) by 13 days.

(21) Appl. No.: 14/027,229

(22) Filed: Sep. 15, 2013

(51) Int. Cl.
*A01K 85/10* (2006.01)
*A01K 85/01* (2006.01)
*A01K 85/00* (2006.01)
*A01K 85/12* (2006.01)

(52) U.S. Cl.
CPC .............. *A01K 85/01* (2013.01); *A01K 85/00* (2013.01); *A01K 85/10* (2013.01); *A01K 85/12* (2013.01)

(58) Field of Classification Search
USPC ........ 43/42.02, 42.11, 42.13, 42.19, 42.5, 42, 43/42.03
IPC .................................. A01K 85/00,85/10, 85/12
See application file for complete search history.

(56) References Cited

U.S. PATENT DOCUMENTS

| | | | |
|---|---|---|---|
| 1,787,726 A | 1/1931 | Heddon et al. | |
| 3,192,660 A * | 7/1965 | Guess | 43/42.16 |
| 4,209,932 A * | 7/1980 | Pate | 43/42.11 |
| 4,619,068 A * | 10/1986 | Wotawa | 43/42.11 |
| 4,640,041 A * | 2/1987 | Stanley | 43/42.13 |
| 5,009,023 A | 4/1991 | Hoyt | |
| 6,122,854 A * | 9/2000 | Kinnear | 43/42.02 |
| 6,631,581 B2 * | 10/2003 | Gomes et al. | 43/26.2 |
| 7,627,978 B2 * | 12/2009 | Davis | 43/42.15 |
| 2008/0202015 A1 * | 8/2008 | Langer | 43/42.06 |
| 2009/0145017 A1 * | 6/2009 | Richey | 43/43.14 |
| 2012/0260560 A1 * | 10/2012 | Jones | 43/42.22 |

* cited by examiner

*Primary Examiner* — Christopher Harmon (57) ABSTRACT

A fishing lure comprises a spinning blade that rhythmically changes its direction of rotation. One or more unique link members limit the cyclical amount of blade rotation in either direction. As the wound up link members pause the rotation of the blade, a hydrodynamic force still trying to turn the blade causes the lure body to undergo a slight twist motion. The wound up link members then begin to unravel from a remaining hydrodynamic force still incident on the moving lure. This is sufficient to start the blade spinning in the opposite direction until it is again rotatably limited by the link members and again imparts a twitch motion on the lure body. This cycle continues to repeat indefinitely as the lure moves at a generally constant speed. The cyclically rhythmic alternating blade rotations and the corresponding body twitch motions create lure behavior that better mimics real life prey.

15 Claims, 6 Drawing Sheets

LURE WITH CYCLICALLY REVERSING BLADE ROTATION

BACKGROUND INFORMATION

This disclosure relates to fishing lures. More specifically, this disclosure relates to a bladed lure wherein a common swivel is replaced by one or more link members. As the lure is pulled forward at a generally constant speed, the automatically cycling potential energy of the link members produces alternating clockwise and counterclockwise rotations of a blade member. The cycling blade member rotation in turn helps create a rhythmic twitching motion of the lure.

The construction of a common "spinnerbait" lure is well known. A weighted member and hook are both coupled to a generally V-shaped wire frame. One or more trailing blades are attached to one end the wire frame through a swivel. The swivel allows for unlimited blade rotation as the lure is retrieved, and the blade spins continuously in one rotational direction until lure motion is stopped. All spinnerbaits with hanging blades use swivels to attach such blades to the wire frame in order to allow the blades to freely spin uninterruptedly as the lure moves forward.

Simply attaching a thin trailing object to a lure frame without the use of a swivel has historically resulted in erratic and unpredictable behavior of the trailing object. U.S. Pat. No. 1,787,726 to Heddon, et al., describes a plurality of thin metal minnows non-rotatably linked to a wire frame of the lure. Because no swivels are used, the metal minnows sway and dart randomly as the lure moves through the water. As a result, no cyclical minnow rotation or corresponding twitching of the lure body can occur. Such unpredictable movement is overcome by the lure described herein, which contains no swivels yet generates controlled and cyclically alternating blade rotation coupled with a cyclical twitching motion of the lure.

For the sake of this invention, the term "rotating" is defined as a blade completing at least one full clockwise revolution or at least one complete counterclockwise revolution (360° blade rotation or greater). The terms "oscillating," "darting," "swaying," and "fluttering" represent an incomplete revolution of rotation, as these terms are most often used to describe motion in other lures wherein swivels are not used to attach trailing metallic members. When describing a constant speed of forward lure motion, the term "constant" is defined as an angler turning a fishing reel at a generally steady rate of rotation in an attempt to cause the fishing line to pull the lure forward with a generally unchanging speed in water. Said differently, an angler is not deliberately twitching, jerking, or pausing the fishing line. "Constant" lure motion can also be defined as a lure that is being trolled behind a boat moving at a generally steady and unchanging speed.

Research has shown that fish are more responsive to irregular vibrations versus those that are more continuous in nature. A rotating blade on an existing spinner lure emits an unchanging vibration signature as the lure moves a constant speed. Thus, common spinner lures are limited to generally emitting only steady, continuous sounds under water. A spinner lure that could combine the ease of angler retrieval (lure moving at a steady speed) with cyclical blade rotation and rhythmic body twitches (periodic vibrations and impulses, and not continuous ones) would possess significant advantages over traditional spinner lures. Such a lure would create both visual and auditory stimuli that closer mimic the swimming behavior of real life prey. There exists the need for a new and improved type of spinner lure that can simultaneously exhibit rhythmically alternating blade rotations along with cyclical twitch movements when the lure is retrieved at a constant speed.

SUMMARY OF THE INVENTION

A lure consists of a wire form member, a weighted member, a hook, and at least one novel link member coupling at least one blade to an eyelet located along the wire form member. The link member is desirably not a swivel and desirably cannot allow continuous and unlimited rotation of the blade. Upon initial lure retrieval, the blade begins spinning by rotating in either direction, but after a few revolutions, the blade rotation must pause as the wound up non-swivel link member temporarily binds or locks. The hydrodynamic forces spinning the blade continue to try and turn the blade through a residual "twist torque" acting on the blade from the water. However, since the blade is temporarily locked from further rotation, this twist torque is instead transmitted through the wire form member and to the weighted member. The weighted member starts to swing upward with a sideways twitch motion due to this small twist torque. As the weighted member swings upward, a restoring torque—produced by gravity acting on the weighted member during its upswing—begins to develop and increases as the weighted member swings upward from a bottom 0° position towards an outward 90° position. If the weighted member is heavy enough such that it does not swing or "twitch" beyond 90° and cause the lure to spiral out of control, then the weighted member will pause as it reaches a position of equilibrium at the peak of its slight upswing. A remaining hydrodynamic force—produced from water continually pushing back on the link member as the lure moves forward—then causes the unraveling of the coiled up link member. This slight unraveling of a link member creates just enough freedom to allow the blade to then begin rotating in the opposite rotational direction as the weighted member then also returns to its central neutral position. The cycle then begins to repeat itself as the blade's new rotation starts to slow due to the coiling or binding of the non-swivel link member. As a result, the moving lure behaves with a repeating pattern wherein the blade cyclically changes rotational direction while simultaneously imparting a periodic twitch or jerk motion into the lure body.

Objects and advantages of the lure with cyclically reversing blade rotation are as follows:
1. The changing rotational direction of the blade results in a steady, rhythmic beating sound under water versus the continuous rotation vibration sound of common spinner lures.
2. The changing rotational direction of the blade results in a visual twitch of the lure body corresponding to each directional change in blade rotation.
3. The unique swimming behavior of the lure does not require an angler to vary the retrieval speed of the lure.

These and other objects and advantages will become readily apparent upon review of the following specification and drawings.

DRAWINGS

Reference Numerals 20 blade member
40 wire form member
60 swivel
80 rotation axis
100 weighted member
120 hook
140 skirt
160 lure
180 first eyelet
200 second eyelet
220 first link member
240 second link member
260 neutral position
280 counterclockwise direction
300 counterclockwise arc trajectory
320 clockwise direction
340 clockwise arc trajectory
360 first aperture
380 median plane
400 second aperture
420 spinner
440 spacer member
460 first leg
480 second leg
500 apex
520 first end
540 second end
560 chain

DETAILED DESCRIPTION OF PREFERRED EMBODIMENTS

Figure 1:
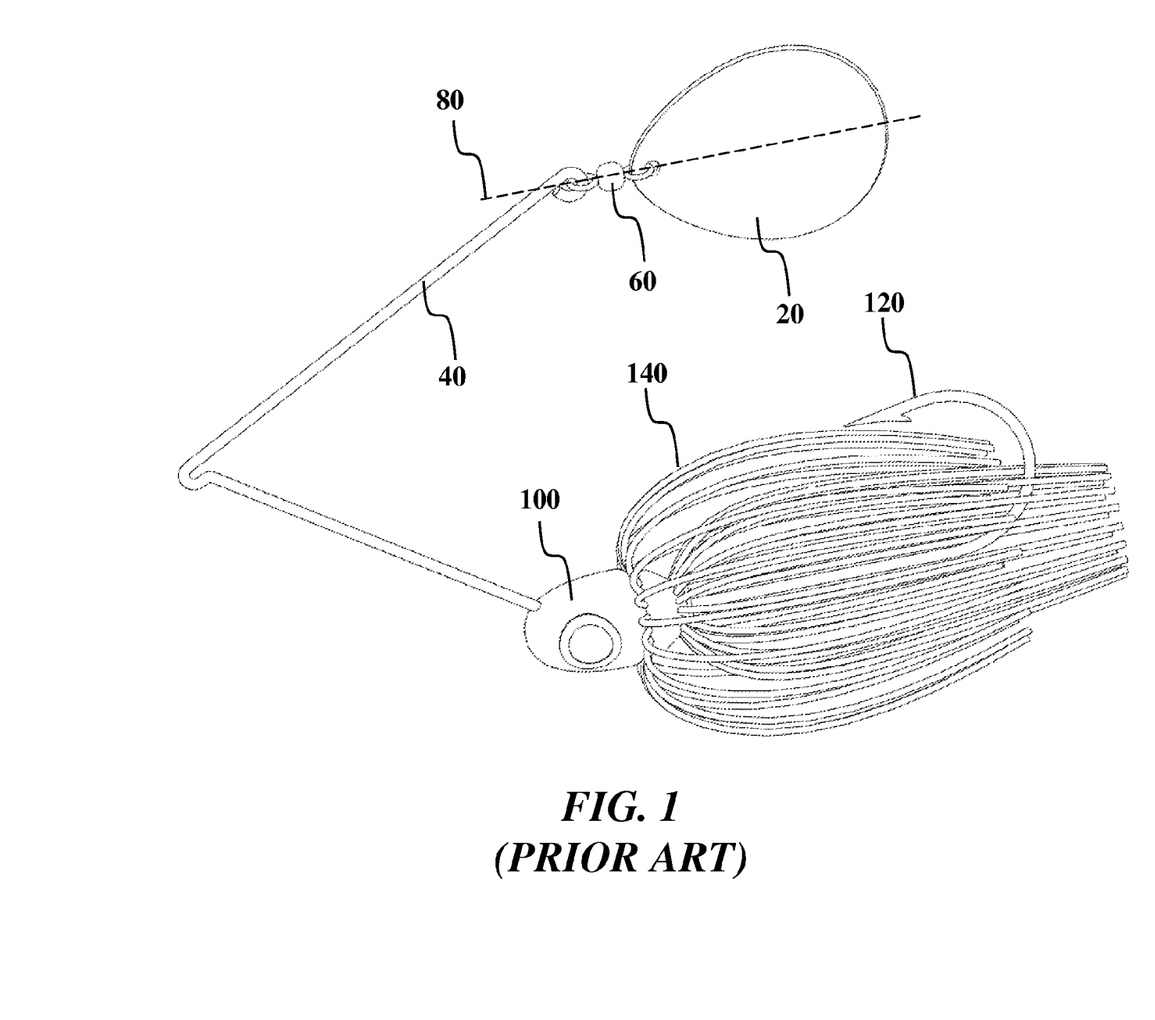
FIG. 1 is a diagrammatic perspective view of prior art.

FIG. 1 illustrates the prior art of a common spinnerbait. A blade member 20 is coupled to one end of a V-shaped wire form member 40 through a swivel 60, and the swivel 60 allows for unlimited and free rotation of the blade member 20 about a rotation axis 80. A weighted member 100 and hook 120 are also coupled to the wire form member 40. An elastomeric skirt 140 or other rubber trailer is often attached to help disguise the hook 120. The key element of the spinnerbait is the swivel 60, which allows continuous, unlimited rotation of the blade member 20 while the spinnerbait is moving forward.

Figure 2:
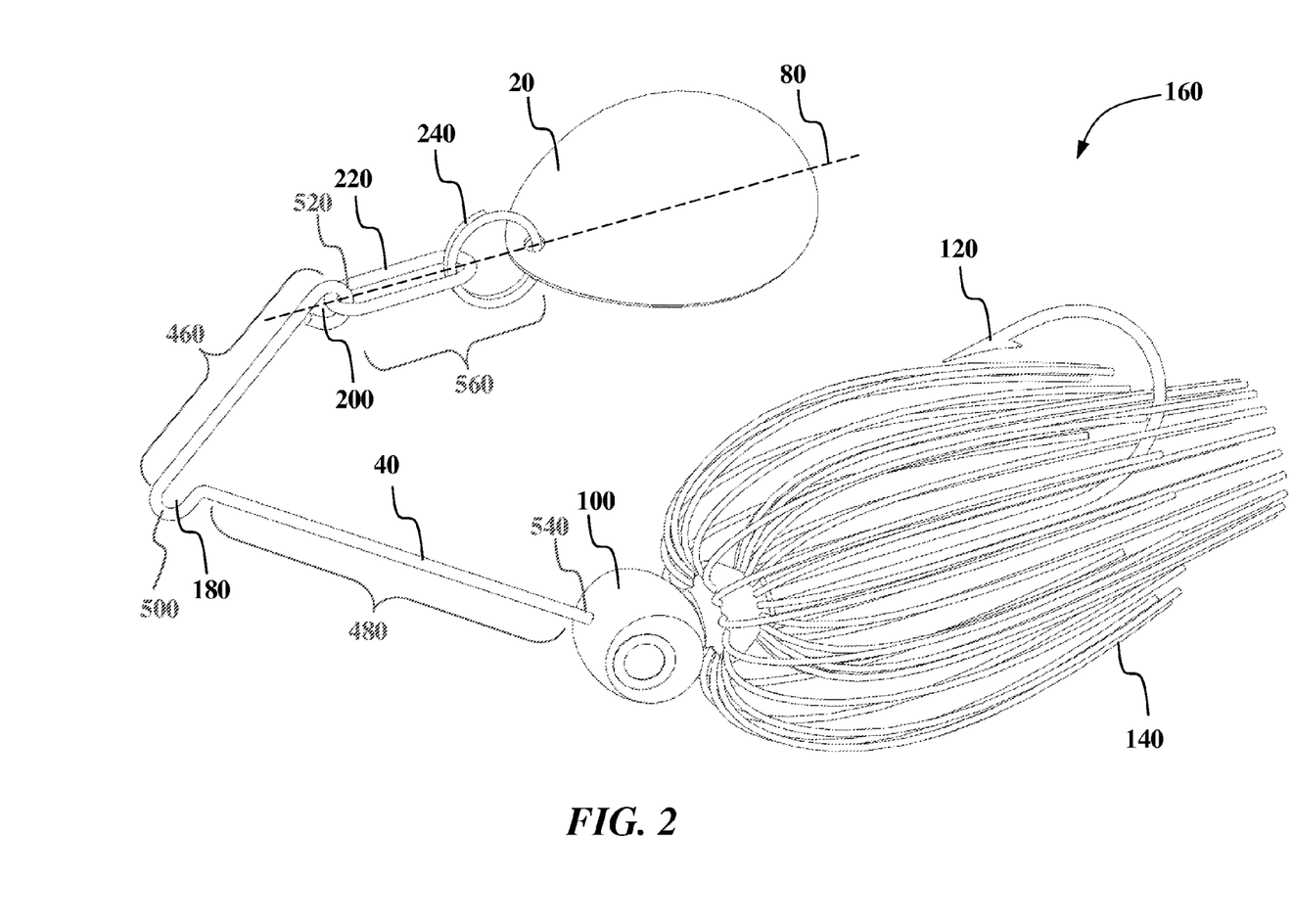
FIG. 2 is a diagrammatic perspective view of a first preferred embodiment in accordance with the present invention.

FIG. 2 illustrates a first preferred embodiment of a lure 160 with cyclically reversing blade member 20 rotation. Several common elements are shown, such as a blade member 20, wire form member 40, weighted member 100, hook 120, and skirt 140. A first eyelet 180 and second eyelet 200 are also now identified. In FIG. 2, the wire form member 40 is further characterized by a first leg 460 and a second leg 480 with an apex 500 located between the first leg 460 and second leg 480. The first leg 460 has a first end 520, or a point along the first leg 460 located generally furthest away from the apex 500, while the second leg 480 has a second end 540, or a point along the second leg 480 located generally furthest away from the apex 500. The apex 500 is located adjacent to the first eyelet 180, while the first end 520 is located adjacent to the second eyelet 200. Said differently, FIG. 2 depicts the blade member 20 and weighted member 100 as being located on opposing ends of wire form member 40. In other words, the weighted member 100 is opposably mounted relative to the blade member 20, with the first eyelet 180, or line attachment means, located therebetween. In addition, and as shown in FIG. 2, the first leg 460 is generally shorter than the second leg 480. The improvement over common spinnerbaits is achieved through replacing the common swivel 60 of FIG. 1 with at least one non-swivel link member. One or more non-swivel link members provide a means for cyclically storing and releasing potential energy within a constantly moving lure 160. It should be noted that a swivel 60 allowing unlimited rotation of a blade member 20 does not provide any means for storing any rotational potential energy of a rotating blade member 20. A first link member 220 is shown coupled to a second link member 240, with the first link member 220 coupled to the second eyelet 200 of the wire form member 40 and the second link member 240 coupled to the blade member 20. As depicted in FIG. 2, the first link member 220 and second link member 240 together form a chain 560 of non-swivel link members. In this first preferred embodiment, the first link member 220 is an elastomeric loop, and the second link member 240 is a metallic split ring. It is obvious from the closed perimeter shape of the first link member 220 and second link member 240 that unlimited rotation of the blade member 20 cannot occur as the lure 160 moves forward in a generally upright position. After rotating or spinning for a predetermined duration generally around the rotation axis 80, which is an axis shown generally parallel to the forward direction of lure travel and not passing through the weighted member 100 or apex 500, the blade member 20 slows down and stops rotating as the blade member 20, first link member 220, and second link member 240 rotatably interfere with each other. This slowing down and pausing of the spinning blade member 20, as well as the mechanism by which the blade member 20 then cyclically alternates rotation direction, are both explained in detail using the illustrations of FIGS. 3A-3E.

Figure 3A:
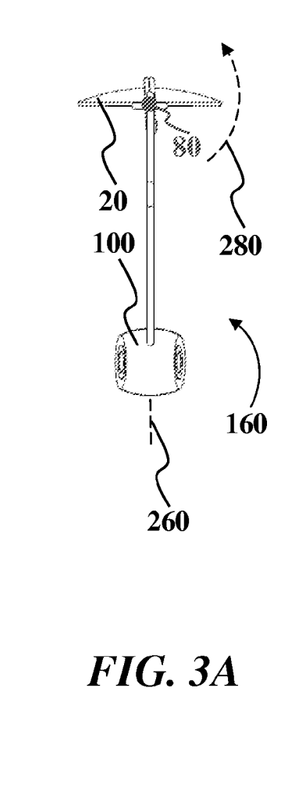
FIGS. 3A-3E are diagrammatic front views of the first preferred embodiment, with elastomeric skirt removed, in sequential order to explain the rhythmic reversal of the blade member rotation that occurs as the lure is pulled forward at a constant speed.

FIGS. 3A-3E show consecutive front views of the first preferred embodiment and sequentially describe two cycles of rotational direction reversal of the blade member 20. The elastomeric skirt 140 has been removed from the preferred embodiment in FIGS. 3A-3E to make the behavior of the lure 160 easier to visualize. While it may seem complex, this sequence of consecutive steps defining lure 160 behavior is actually quite simple. In FIG. 3A, the weighted member 100 is shown centered in a generally neutral position 260, and the blade member 20 is shown already rotating in a counterclockwise direction 280. The blade member 20 will continue to rotate in a counterclockwise direction 280 until the link members lock up or bind as their potential energy relative to the moving lure reaches a temporary maximum. At this instant, the rotation of the blade member 20 has slowed to a temporary halt.

Figure 3B:
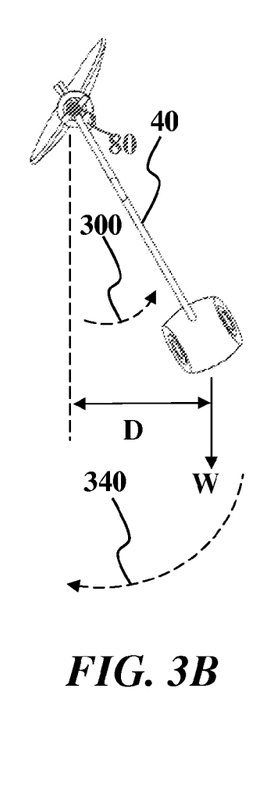

FIG. 3B shows the orientation of the lure just moments after the link members bind and pause blade member 20 rotation. The hydrodynamic rotational force on the blade member 20 still attempts to turn the blade member 20 in a counterclockwise direction 280 generally around the rotation axis 80, with a slight twist torque even though the blade member 20 is prevented from further rotation by the binding of the link members. However, with the blade member 20 being momentarily locked and unable to move, the twist torque is instead transmitted through the wire form member 40 and the result of this twist torque is to swing up both the wire form member 100 and the weighted member 100 along a counterclockwise arc trajectory 300. This counterclockwise arc trajectory 300 is shown in FIG. 3B as a momentary angular displacement of generally 90 degrees or less of the wire form member 40 and weighted member 100 around an axis generally parallel with the rotation axis 80. As the weighted member 100 begins to move along the counterclockwise arc trajectory 300, a restoring torque produced by the upswing of the weighted member 100 will begin to develop.

The restoring torque is mathematically defined as "(D)(W)," or distance "D" multiplied by weight "W," and one can see that the restoring torque increases as the weighted member 100 upswing movement along the counterclockwise arc trajectory 300 increases. That is, a larger twist torque from the stalled blade member 20 is required to swing the weighted member 100 further along the counterclockwise arc trajectory 300. If the hydrodynamic twist torque on the blade member 20 is too large and/or the mass of the weighted member 100 is too small, then the weighted member 100 will continue to rotate in the counterclockwise arc trajectory 300 beyond 90° and the entire lure 160 will begin to undesirably spin around in a corkscrew or helical type path. Conversely, if the weighted member 100 is of sufficient predetermined mass relative to the twist torque from the blade member 20, then the twist torque imparted on the weighted member 100 from the stalled blade member 20 will cause the weighted member 100 to desirably just twitch slightly in the counterclockwise arc trajectory 300 and limit the amount of weighted member 100 upswing in the counterclockwise arc trajectory 300 to below 90°. Said differently, it is desirable that the magnitude of the twist torque equal to the magnitude of the restoring torque before the weighted member 100 reaches the 90° position. This slight upswing twitch pulse of the weighted member 100 generally defines an angular displacement of the weighted member 100. From the perspective of an angler looking down on a moving lure 160, this slight angular displacement of the weighted member 100 appears as a momentary sideways pulse or twitch of the lure 160. With the blade member 20 rotation paused, and with the weighted member 100 now also paused slightly at a distance D offset from the neutral position 260 as a result of the twist torque now equaling the restoring torque, one might think that the lure 160 would continue to translate forward in the water in this seemingly stalled blade member 20 orientation and stalled weighted member orientation. However, there is one other significant force at work on the lure 160. Recall that while the blade member 20 was initially rotating, the first link member 220 and second link member 240 were also turning, essentially "winding up" the chain of link members much like a torsion spring. After the blade member 20 and weighted member 100 both pause or stall in an orientation similar to that of FIG. 3B, there is also a remaining hydrodynamic force pushing rearward on the coiled link members from the incident water pressure exerted on the forwardly moving lure 160. Said differently, as the lure 160 continues to move at a constant speed, this remaining hydrodynamic force pushes on the link members in a direction opposite to the traveling direction of the lure 160. This hydrodynamic force pushes against the temporarily locked link members in a manner as to cause the link members to begin to uncoil or unlock from one another. The slight unraveling of the link members provides just enough freedom to cause the blade member 20 to now begin turning in an opposite or clockwise direction 320. At this same instant, the weighted member 100—no longer under the influence of a "twist torque" from a stalled blade member 20—swings back down in a clockwise arc trajectory 340 and returns to the bottom neutral position 260. It should be understood that this "uncoiling" of one or more link members can be sped up by using an elastomeric material for one or more link members. An elastomeric link member can store additional potential energy as the link members are "wound up" by the rotating blade member 20, such that the link members unravel or uncoil with a faster rotational speed than if the link members were each made from a rigid inflexible material.

Figure 3C:
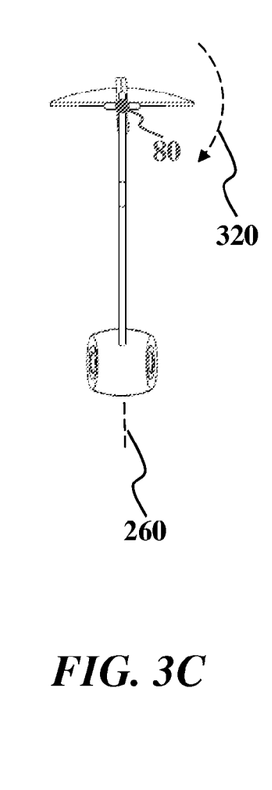

FIG. 3C shows the lure 160 moments later and generally aligned back in the neutral position 260. This time, the blade member 20 is continuing to rotate in the opposite or clockwise direction 320. Said differently, the state of the lure 160 in FIG. 3C is similar to the state of the lure 160 in FIG. 3A, but with the blade member 20 now spinning in a clockwise direction 320.

Figure 3D:
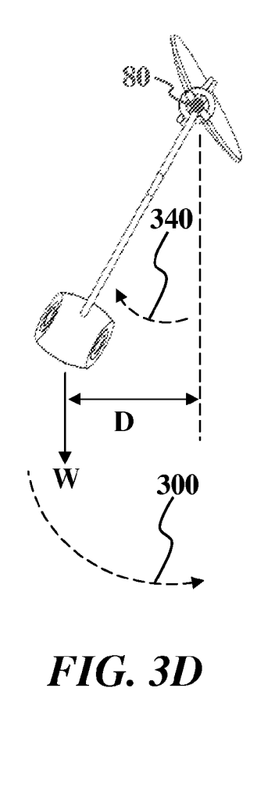
Figure 3E:
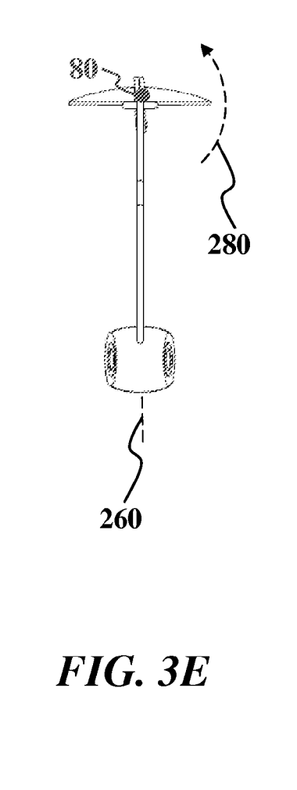

FIG. 3D is similar to FIG. 3B, and it illustrates the momentary condition of the lure 160 when the now clockwise rotation 320 comes to a halt as a result of the wound up and binding link members. When the blade member 20 again stops rotating, the hydrodynamic force still trying to turn the blade member 20 will again impart a twist torque on the lure 160 that will be transmitted to the weighted member 100. The weighted member 100 will now twitch slightly along a clockwise arc trajectory 340 until the magnitude of the restoring torque "(D)(W)" equals the magnitude of the twist torque. With the blade member 20 and weighted member 100 both stalled, the remaining hydrodynamic force still pushing rearward on the link members again acts to begin to uncoil the link members. The slight uncoiling or loosening of the link members provides enough freedom for the blade member 20 to begin rotating in an opposite or counterclockwise direction 280. With the blade member 20 now rotating in the same original counterclockwise direction 280, the entire lure 160 then returns to the neutral position 260 in as shown in FIG. 3E. The state of the lure in FIG. 3E now matches the original state of the lure in FIG. 3A. FIGS. 3A-3E illustrate two complete blade rotation reversal cycles. This "cyclically reversing blade member 20 rotation direction with corresponding weighted member 100 twitch motion" repeats indefinitely as long as the lure 160 is moving forward at a generally constant speed. Although seemingly lengthy to explain in words, the entire sequence from FIG. 3A to FIG. 3E can take less than a second to complete depending on the mass, shape, and material of the blade member 20, link members, weighted member 100, and speed of the lure 160.

Figure 4:
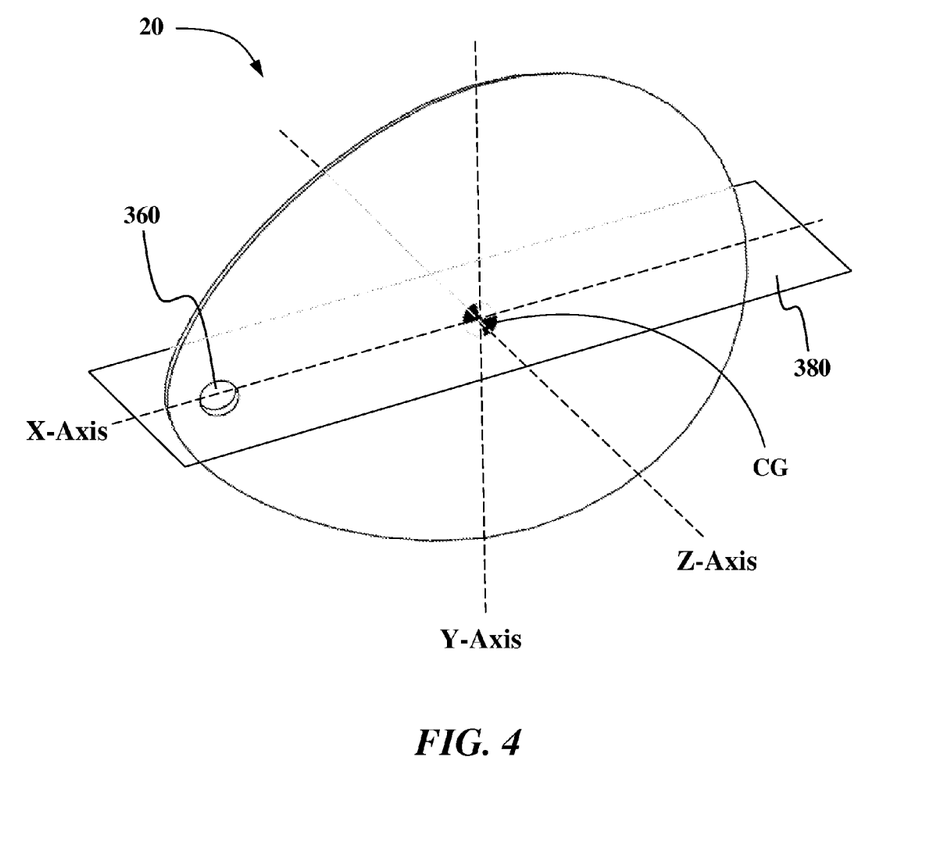
FIG. 4 is a diagrammatic perspective view of a blade member in accordance with the present invention.

FIG. 4 is a perspective view of a blade member 20, with an X-axis, Y-axis, and Z-axis assigned to help describe optimum blade member 20 orientation on the lure 160. The blade member 20 contains a mass evenly distributed about a center of gravity CG, and the blade length along the X-axis is generally larger than the blade width across the Y-axis, with both blade length and width being substantially larger than blade thickness in the Z-axis. Because it has mass and a defined shape, the blade member 20 also comprises a resistance against rotational acceleration known as the mass moment of inertia (I). This mass moment of inertia property can be divided into the following components: the mass moment of inertia around the X-axis ($I_X$), the mass moment of inertia around the Y-axis ($I_Y$), and the mass moment of inertia around the Z-axis ($I_Z$). From physics, it is known that for a body such as a flat plate that comprises different dimensions for length, width, and thickness, the most stable rotation occurs around the two axes corresponding to the largest and smallest mass moments of inertia. One can easily observe this by tossing a common rectangular plate-like object in the air—such as a mobile phone—separately around each of its three axes. Rotation around the X-axis (axis passing through phone length dimension) and Z-axis (axis passing through phone thickness dimension) are both more stable than rotation around the Y-axis, as any attempt to toss and spin the phone steadily about its Y-axis will readily show the phone unrhythmically tumbling and asymmetrically twisting in the air as compared to the more steady rotation observed about the other two axes. For the geometry of the blade member 20 shown in FIG. 4, this means that stable rotation—the type of rotation required in this invention—can only occur if the blade member 20 is constrained to rotate generally around the X-axis or Z-axis. Attempting to rotate the blade member 20 around the Y-axis would result in a more unstable movement of the blade member 20, and such undesirable erratic unpredictable movement is not the same as the rhythmically alternating clockwise and counterclockwise rotations described by this invention. Note in FIG. 4, the blade member 20 includes a first aperture 360 centered about a median plane 380, with the median plane 380 dividing the blade member 20 into two generally equal portions and passing through the X-axis. For the most rhythmic cycling of the lure 160 as described in FIGS. 3A-3E, it is recommended that the first aperture 360 be generally located somewhere along the median plane 380.

Figure 5:
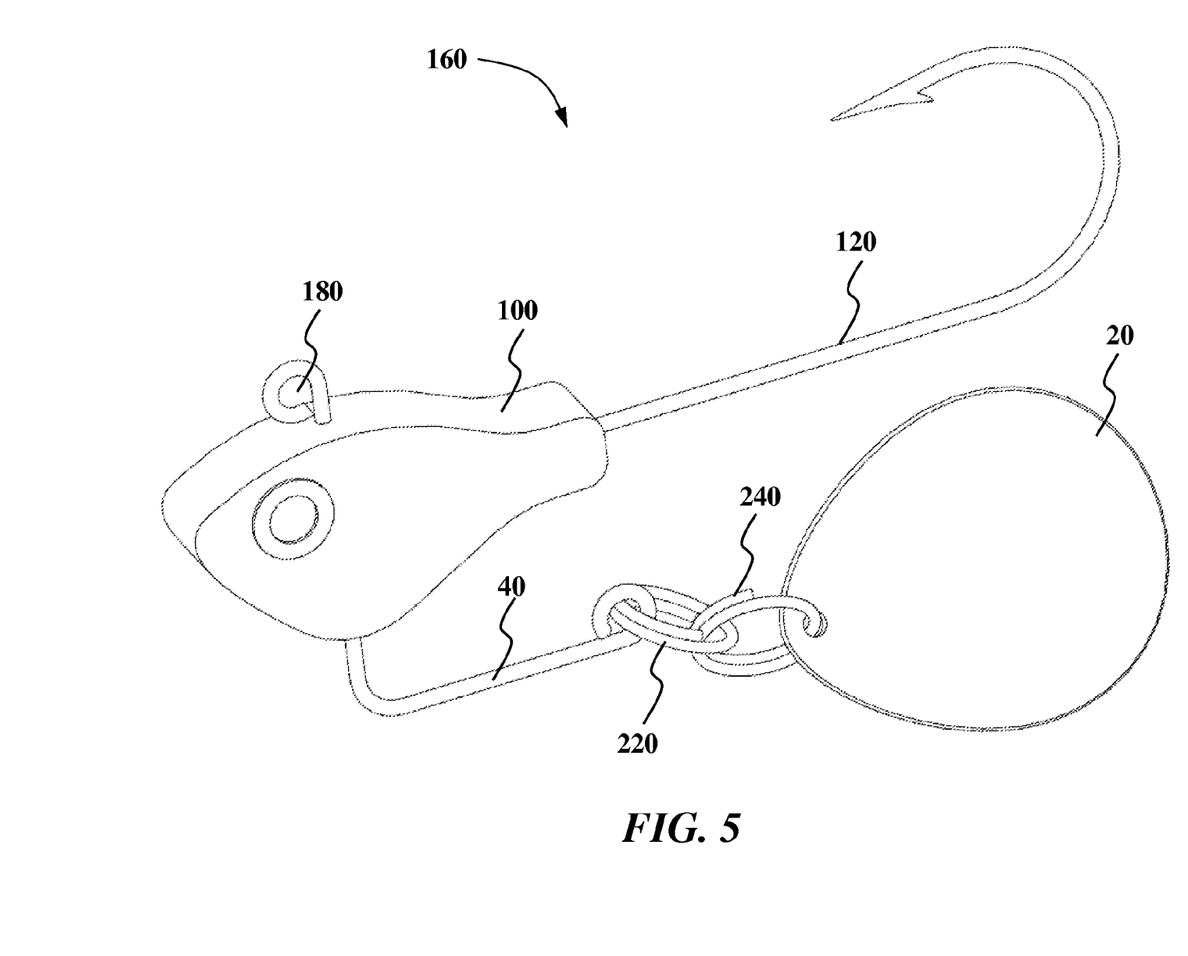
FIG. 5 is a diagrammatic perspective view of a second preferred embodiment in accordance with the present invention.

FIG. 5 is a second preferred embodiment of the lure 160 also comprising a first link member 220 and a second link member 240. However, in this preferred embodiment, both link members are metallic, loop-shaped members. The same basic components remain: a bladed member 20, a wire form member 40, a weighted member 100, and a hook 120. The blade member 20 again cycles between counterclockwise rotation and clockwise rotation in the same manner previously described. An added benefit of using only metallic link members is the unique scraping and scratching sound of the binding link members that is transmitted into the surrounding water. Also, with all link members of this preferred embodiment being made of metal, the cyclical changes between rotation directions create more abrupt twitching motions of the weighted member 100. This metal-on-metal contact during the winding up and winding down of one or more link members can even be large enough that an angler can feel each cyclically binding and unbinding impulse of the link members as such pulses are transmitted up the fishing line and down through a fishing rod. Conversely, if an elastomeric link member replaced one or both of the stiff metallic link members, then the periodic twitch impulses transmitted through the fishing line and into the fishing rod would be much less in magnitude. The reason is because compared to a metallic link member, an elastomeric link member can store more "wound up" potential energy and results in more of a rhythmically whirring vibration pattern underwater instead of the periodic metal-on-metal scraping sounds that rigid metal link members produce. Alternatively, one may use a thin, closed-loop, braided metal cable as one or more of the link members in order to achieve partial benefits of both elastomeric link members and stiff metallic link members.

Figure 6:
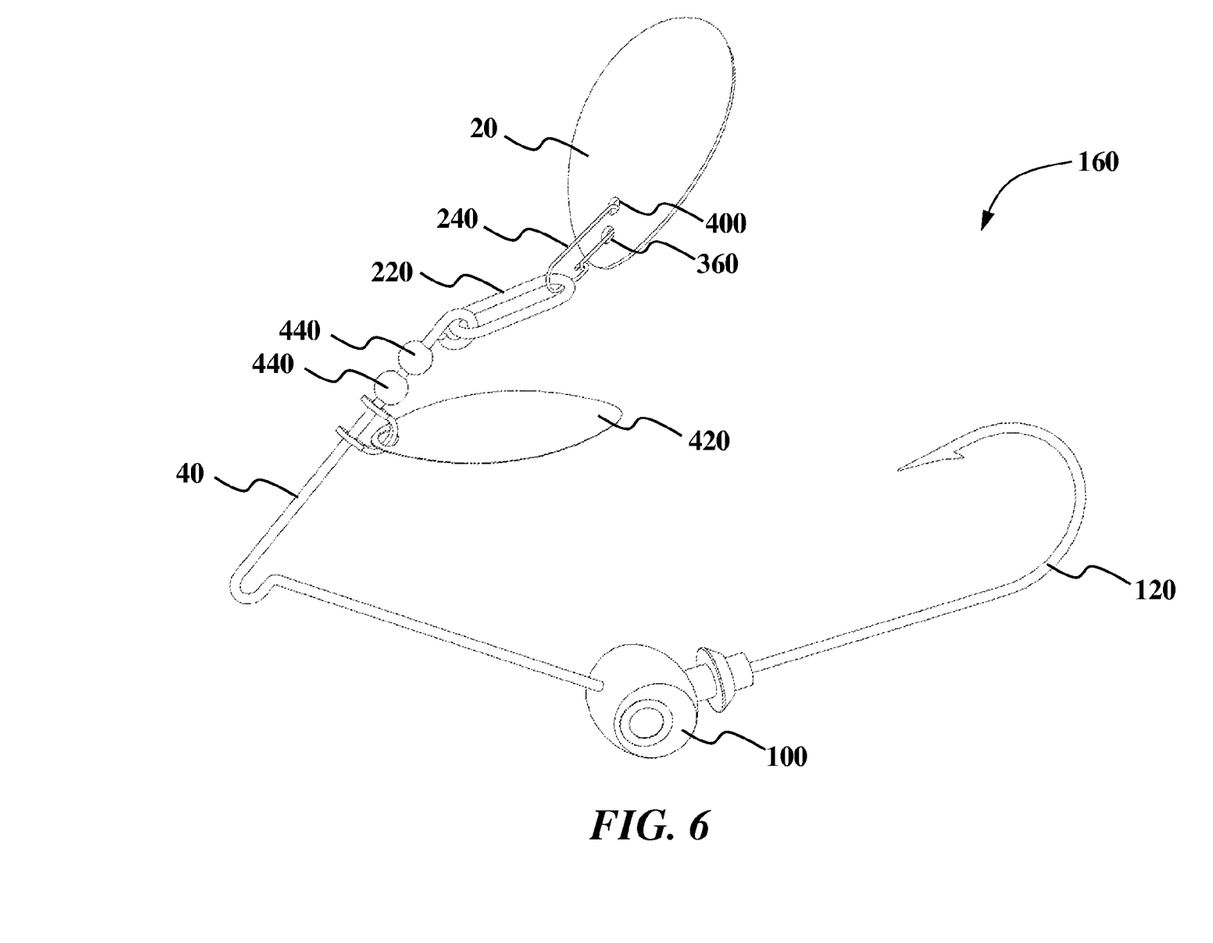
FIG. 6 is a diagrammatic perspective view of a third preferred embodiment in accordance with the present invention.

FIG. 6 illustrates a third preferred embodiment of the lure 160. A first link member 220 and second link member 240 again couple a wire form member 40 to a blade member 20. A hook 120 and weighted member 100 are also coupled to the wire form member 40. The second link member 240 is now a metal clip that passes through both a first aperture 360 and a second aperture 400 of the blade member 20, as compared to the previous preferred embodiments wherein the blade member 20 only comprised a first aperture 360. A separate spinner 420 is also now attached as an additional fish attracting element, and this spinner 420 freely rotates in an unlimited manner around the wire form member 40 as the lure 160 moves forward. At least one spacer member 440 can be used to help prevent rotational interference between the freely rotating spinner 420 and the cyclically rotating blade member 20.

It should be emphasized that for a given mass of the weighted member, certain blade sizes and geometries can enhance the desired cyclical blade rotations and periodic weighted member twitches. For optimum behavior of the lure, the blade should also have a generally curved geometry that defines a slight cup or concave shape. The preferred blade shapes are those such as Colorado blades, which have a broader shape or footprint as compared to Willow Leaf blades, which are more elongated and slender in shape. As a result of their broad shape, Colorado blades generally have a higher mass moment of inertia around the X-axis, or $I_X$, as compared to a Willow Leaf blade of the same length, and this can help better stabilize a moving lure in the neutral position in between the periodic twitches of the weighted member. Other common broad blade shapes are Indiana blades and Oklahoma blades. Similarly, for a given blade member footprint or size, a higher blade mass can also increase $I_X$ and help stabilize motion of the lure. However, it should be noted that there is a limit to the blade size that can successfully be used, as a blade with too much surface area and/or too much mass can possess too much angular momentum for a given lure speed and given weighted member mass, and the resulting large twist torque transmitted from the blade to the weighted member can cause the entire lure to begin undesirably spiraling out of control in the water. On the other hand, a blade of too small a surface area and/or mass can lack enough angular momentum to fully wind up the chain of link members and cause the desired twitching magnitude of the weighted member. If an angler wanted to retrieve the lure with a fast speed in order to make many casts to expose the lure to as much water as possible, then a smaller broad blade would be preferred. Alternatively, if an angler were fishing in colder months when fish are more lethargic and less likely to chase fast moving baits, then a larger broad blade would be ideal to help slow the cyclical frequency of the blade rotation reversals. Thus, there are optimum combinations of the "$I_X$" of a blade member and the mass of a weighted member that will result in the desired frequency and magnitude of both the rhythmic rotation changes of the blade and the cycling twitch motions of the weighted member.

The properties of an elastomeric material, when used for one or more link members, also play an important role in lure behavior. Softer or more stretchable elastomeric link members can allow the blade member to wind and unwind more smoothly and generate more consistent twitch pulses of the weighted member, all while creating a broader rhythmic whirring sound under water. Conversely, stiffer or harder elastomeric link members can create a more noticeable and less precise cyclical twitch pulse of the weighted member. For lure longevity, it is preferred that any elastomeric link member material not easily tear or crack, with the material also able to withstand sustained exposure to the harsh outdoor environment found in freshwater and saltwater fishing.

The number of link members also affects lure behavior. Increasing the number of link members increases the time between the periodic twitches of the weighted member and increases the number of clockwise or counterclockwise rotations of a blade before a rotation direction reversal occurs. Alternatively, if an angler prefers an increased frequency of the periodic twitches of the weighted member for a given retrieval speed, then fewer link members can be used.

Ideally, the geometry of the wire form member near the second eyelet should be free of any burrs or kinks, and the end of the wire form member at the second eyelet location should be neatly formed and not protruding out where it could interfere with any of the twisting link members. Also, it is preferred that the opening width of any link member be less than the width of the second eyelet to which the chain of link members is attached, so that any link member cannot accidentally loop around or "lasso" the second eyelet end of the wire form member as the link members cyclically wind and unwind. Having the second eyelet end of the wire form member be generally parallel to the blade member axis of rotation, similar to what is depicted in FIG. 5, also can help reduce the chance that a winding up link member will get caught by or wrap around the wire form member near the second eyelet location.

The location of the center of gravity of a blade member relative to the weighted member also affects lure behavior. Moving the blade member closer to the weighted member can result in slightly larger twitch pulse magnitude of the weighted member, while moving the blade further back from the weighted member can result in larger pulse magnitudes of the hook area or rear portion of the lure relative to the pulse magnitude of the weighted member. Also, it is recommended that the rotation axis of the blade member generally not pass through the weighted member, in order to help keep the moving lure upright and not easily cause the lure to spiral out of control.

It should be understood that there are many more obvious variations of the preferred embodiments described herein. For example, one or more link members can be made from a plastic material or woven material in addition to the elastomeric and metallic materials previously described. Using a thin plastic film as one of the link members can allow for similar lure behavior as an elastomeric link member, and a plastic material would not degrade as easily after prolonged exposure to extreme temperatures and intense solar radiation. Of course, one or more link members can obviously and simply be a common torsion spring made from thin metal wire that is already pre-formed into a helical or spiral shape.

Similar to common "jig spinner" lures wherein a separate wire form member detachably mounts to a weighted jig head, the wire form member of the invention can be a separate part that detachably mounts to a hook, and the weighted member can surround a portion of a hook such that the hook passes through the weighted member. Said differently, the lure can be modular in construction.

It is also obvious that one or more rattle members can be coupled to either a wire form member, a hook, a weighted member, or a blade member through any of the means well known in the art of attaching rattle members to spinner lures. Adding at least one rattle member would cause the lure to be even louder and more easily detected by fish, since each periodic twitch pulse of the lure would also cause corresponding rattle sounds from the rattle members. Similarly, an improvement to existing rattling lures or crankbaits can be achieved by simply adding the potential energy cycling means described herein. With the weighted member defining the body of the crankbait, such an improved crankbait lure would then also comprise a rotating blade that rhythmically changes rotation direction and imparts periodic twitches into the crankbait lure body. Lastly, additional beads, devises, rings, pins, spacers, weights, and other small lure-making components can also be used when constructing the novel lure.

While certain preferred embodiments have been described and shown in the accompanying drawings, it is to be understood that such preferred embodiments are merely illustrative of, and not restrictive on, the broad invention. Furthermore, it is to be understood that this invention shall not be limited to the preferred embodiments shown and described, as various modifications or changes will be apparent to those of ordinary skill in the art without departing from the spirit and scope of the preferred embodiments as claimed. It is intended that the scope of the invention be defined by the following claims and their equivalents.

What is claimed is:

1. A fishing lure, comprising:
a wire form member having a first leg and a second leg, said first leg and said second leg converging at an apex, said first leg terminating at a first end and said second leg terminating at a second end;
wherein a first eye means is generally located adjacent to said apex for coupling a fishing line thereto; said wire form member having a second eye means generally located adjacent to said first end for coupling at least one blade member thereto;
wherein said blade member is able to spin around a rotation axis generally parallel with a forward direction of travel of said lure, wherein said rotation axis is not generally aligned with said apex;
at least one weighted member coupled to said second end of said wire form member, wherein said at least one weighted member is not generally aligned with said rotation axis;
a potential energy storing means comprising a chain of more than one non-swivel link members coupling said at least one blade member to said second eye means of said wire form member;
wherein said at least one blade member and said at least one weighted member and said chain of link members are sized and dimensioned for enabling said lure to exhibit a cyclical swimming movement generally defined by said at least one blade member rotating more than 360 degrees in a first rotational direction around said rotation axis, subsequently followed by a first momentary angular displacement of said wire form member of generally 90 degrees or less around an axis generally parallel to said rotation axis, subsequently followed by said at least one blade member rotating more than 360 degrees in an opposite rotational direction, subsequently followed by a second momentary angular displacement of said wire form member of generally 90 degrees or less, wherein simultaneously said lure maintains a generally upright orientation while moving forward at a generally constant speed.

2. A fishing lure in accordance with claim 1 further comprising at least one hook coupled to said wire form member.

3. A fishing lure in accordance with claim 2 wherein said at least one weighted member surrounds a portion of said at least one hook.

4. A fishing lure in accordance with claim 1 wherein said at least one weighted member is detachably coupled to said wire form member.

5. A fishing lure in accordance with claim 1 further comprising at least one rattle member.

6. A fishing lure, comprising:
a wire form member having a first leg and a second leg, said first leg terminating at a first end and said second leg terminating at a second end;

wherein a first eye means is located along said wire form member between said first end and said second end for coupling a fishing line thereto; said wire form member having a second eye means generally located adjacent to said first end for coupling at least one blade member thereto;

at least one weighted member coupled to said second end of said wire form member;

a potential energy storing means comprising at least one non-swivel link member coupling said at least one blade member to said second eye means of said wire form member;

wherein said at least one blade member can rotate around a rotation axis, said rotation axis generally parallel with a forward direction of travel of said lure, said rotation axis not generally aligned with said at least one weighted member;

wherein said at least one non-swivel link member enables more than 360 degrees of rotation of said at least one blade member relative to said wire form member while simultaneously preventing unlimited rotation of said at least one blade member;

wherein said lure moving forward at a generally constant speed causes a repeating cycle of an increase and decrease of said potential energy corresponding to a repeating angular displacement of generally 90 degrees or less of said wire form member around an axis generally parallel with said rotation axis;

wherein said at least one blade member and said a least one weighted member are sized and dimensioned to enable said lure to maintains a generally upright orientation while being pulled forward at said generally constant speed.

7. A fishing lure in accordance with claim 6 further comprising at least one hook coupled to said wire form member.

8. A fishing lure in accordance with claim 7 wherein said at least one weighted member surrounds a portion of said at least one hook.

9. A fishing lure in accordance with claim 6 wherein said at least one weighted member is detachably coupled to said wire form member.

10. A fishing lure in accordance with claim 6 further comprising at least one rattle member.

11. A fishing lure, comprising:
a wire form member having a first leg and a second leg, said first leg terminating at a first end and said second leg terminating at a second end;

wherein a first eye means is located along said wire form member between said first end and said second end for coupling a fishing line thereto; said wire form member having a second eye means generally located adjacent to said first end for coupling at least one blade member thereto, a rotation axis of said at least one blade member generally parallel to a forward direction of travel of said lure;

at least one weighted member coupled to said second end of said wire form member, wherein said at least one weighted member is not generally aligned with said rotation axis;

at least one non-swivel link member coupling said at least one blade member to said second eye means of said wire form member, said at least one non swivel link member enabling more than 360 degrees of rotation of said at least one blade member relative to said wire form member, said at least one non swivel link member simultaneously preventing unlimited rotation of said at least one blade member relative to said wire form member;

wherein said lure moving forward at a generally constant speed in combination with said at least one non-swivel link member enable at least one bladed member to cyclically change rotation direction after said more than 360 degrees of rotation, wherein said wire form member exhibits corresponding angular displacements of generally 90 degrees or less around an axis generally parallel to said rotational axis, wherein said lure maintains a generally upright orientation while moving forward at said generally constant speed.

12. A fishing lure in accordance with claim 11 further comprising at least one hook coupled to said wire form member.

13. A fishing lure in accordance with claim 12 wherein said at least one weighted member surrounds a portion of said at least one hook.

14. A fishing lure in accordance with claim 11 wherein said at least one weighted member is detachably coupled to said wire form member.

15. A fishing lure in accordance with claim 11 further comprising at least one rattle member.

* * * * *